(12) United States Patent
Thompson

(10) Patent No.: US 7,645,949 B1
(45) Date of Patent: Jan. 12, 2010

(54) PORTABLE SCALE HAVING GUIDE MECHANISM OF SLOTTED RAIL AND CAPTIVE TROLLEY

(76) Inventor: Donald Glenn Thompson, 25120 S. Metzler Park Rd., Estacada, OR (US) 97023

( * ) Notice: Subject to any disclaimer, the term of this patent is extended or adjusted under 35 U.S.C. 154(b) by 0 days.

(21) Appl. No.: 12/220,365

(22) Filed: Jul. 24, 2008

(51) Int. Cl.
*G01G 21/00* (2006.01)
(52) U.S. Cl. .................. 177/126; 177/148; 177/238
(58) Field of Classification Search .............. 177/126, 177/127, 131, 148, 149, 238
See application file for complete search history.

(56) References Cited

U.S. PATENT DOCUMENTS

| | | | | |
|---|---|---|---|---|
| 2,603,474 | A * | 7/1952 | Mandolf et al. | 177/233 |
| 2,750,184 | A * | 6/1956 | Warndahl | 177/127 |
| 4,936,399 | A | 6/1990 | Christman et al. | |
| 5,031,710 | A * | 7/1991 | Parker et al. | 177/210 FP |
| 6,264,544 | B1 * | 7/2001 | Mullins | 452/191 |
| 6,560,913 | B1 * | 5/2003 | Liao | 43/5 |
| 6,608,261 | B2 | 8/2003 | Thadani | |
| 6,989,495 | B2 * | 1/2006 | Yang | 177/131 |
| 7,173,197 | B1 | 2/2007 | Kasperek | |
| 7,180,015 | B2 | 2/2007 | Hudson | |
| 7,232,961 | B1 | 6/2007 | Godshaw et al. | |
| 7,238,895 | B2 * | 7/2007 | Dittrich et al. | 177/126 |
| D570,719 | S | 6/2008 | Woo | |
| 2006/0054364 | A1 * | 3/2006 | Kamakau | 177/180 |
| 2007/0007048 | A1 | 1/2007 | Gill | |
| 2008/0015956 | A1 * | 1/2008 | Regard | 705/28 |

FOREIGN PATENT DOCUMENTS

GB 2 408 810 A 6/2005

* cited by examiner

*Primary Examiner*—Randy W Gibson

(57) ABSTRACT

A portable digital scale is disclosed, having retractable and stowable handles and weighing hook, as well as a weight display that may be viewed from directly above the scale.

20 Claims, 4 Drawing Sheets

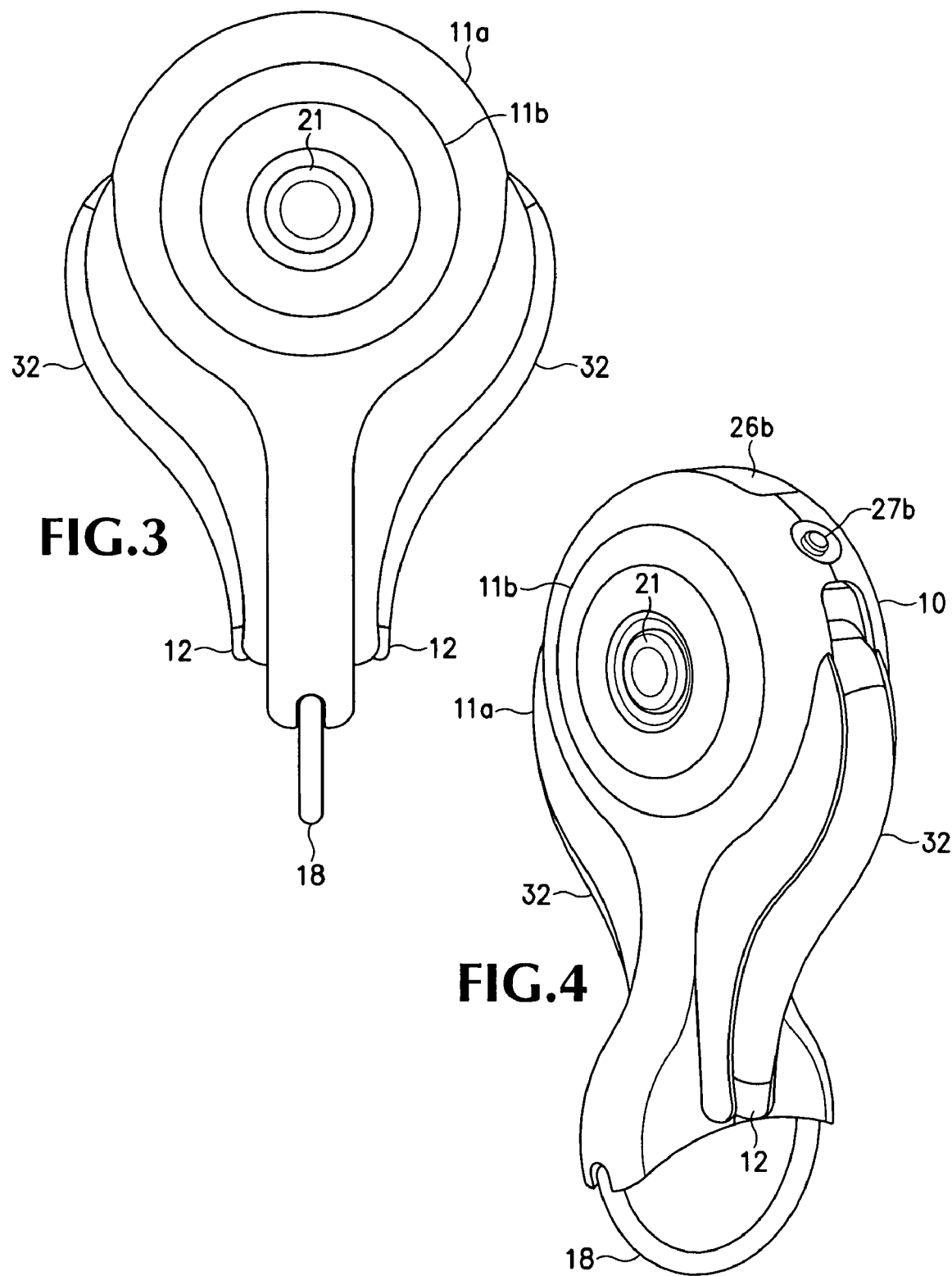

PORTABLE SCALE HAVING GUIDE MECHANISM OF SLOTTED RAIL AND CAPTIVE TROLLEY

BACKGROUND OF THE INVENTION

The ever-increasing cost of fuel has caused the travel industry, and in particular the air travel industry, to assess a surcharge for luggage whose weight exceeds a predetermined maximum. This development has spawned the invention of a fair number of portable luggage scales, the aim of which is to allow the traveler to avoid such surcharges by personally checking luggage weight prior to departure. However, the scales currently available have a number of drawbacks, chief among which are the lack of a weight display viewable from directly above the scale, having only a single handle with which to lift when weighing and lack of stowability of the scale's luggage hook.

These drawbacks are overcome by the present invention, which is summarized and described in detail herein.

BRIEF SUMMARY OF THE INVENTION

According to the present invention there is provided a portable scale having two retractable and stowable handles, a retractable weighing hook and a digital weight display viewable from directly above the scale by the user. The scale's handles reduce user discomfort and promote efficient lifting by providing good balance and a secure grip during weighing. The scale has application in any situation where a fast on-site determination of weight is important, including, without limitation, weighing travel luggage, produce at a farmer's market, shipping packages, back packs, fish and game.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a front elevational view of the scale of FIG. 1 showing its handles and weighing hook in a stowed position.

FIG. 4 is a front perspective view of what is depicted in FIG. 3.

DETAILED DESCRIPTION OF PREFERRED EMBODIMENT

Figure 1:
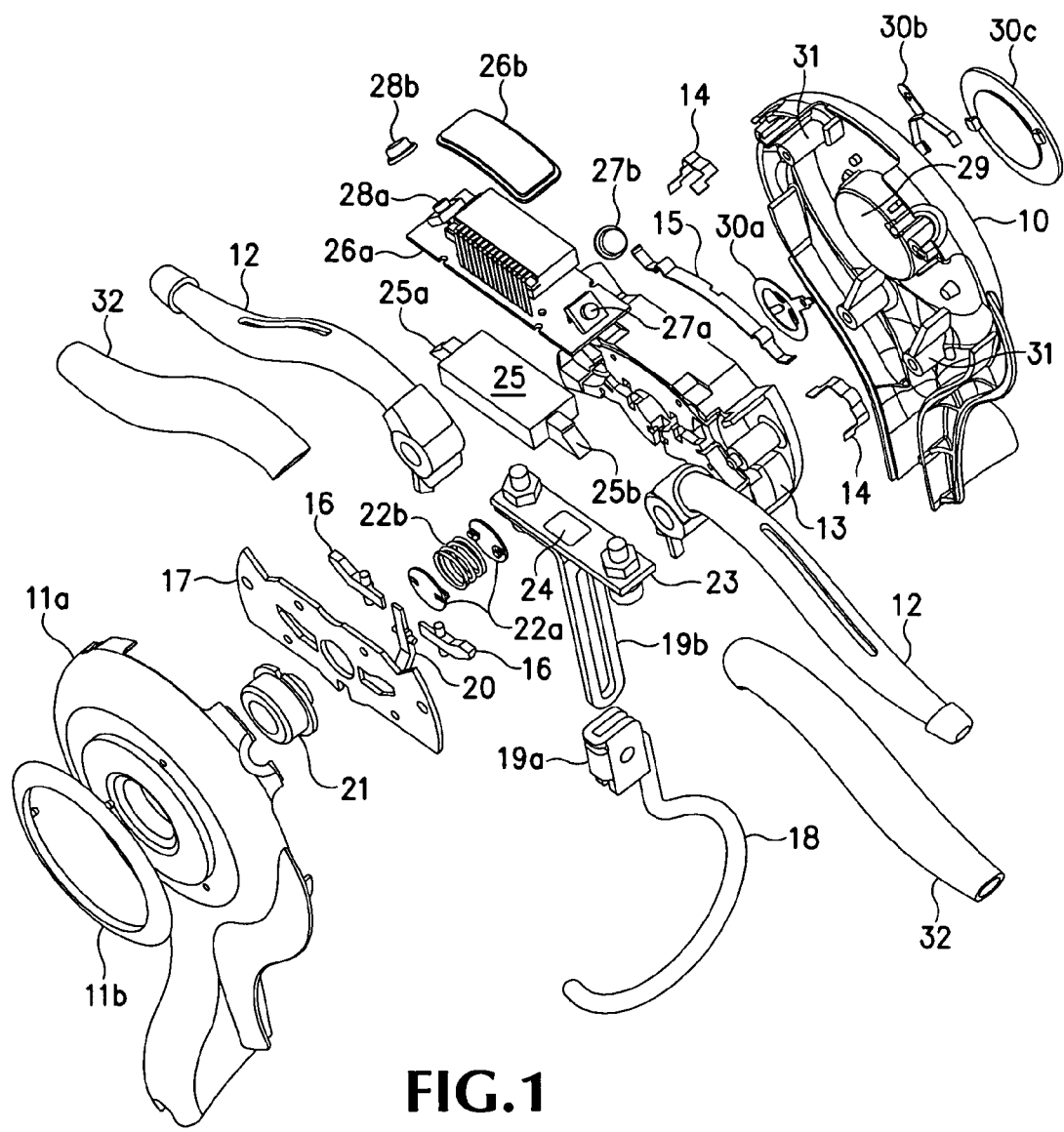
FIG. 1 is an exploded perspective view of the portable scale of the invention.
Figure 2:
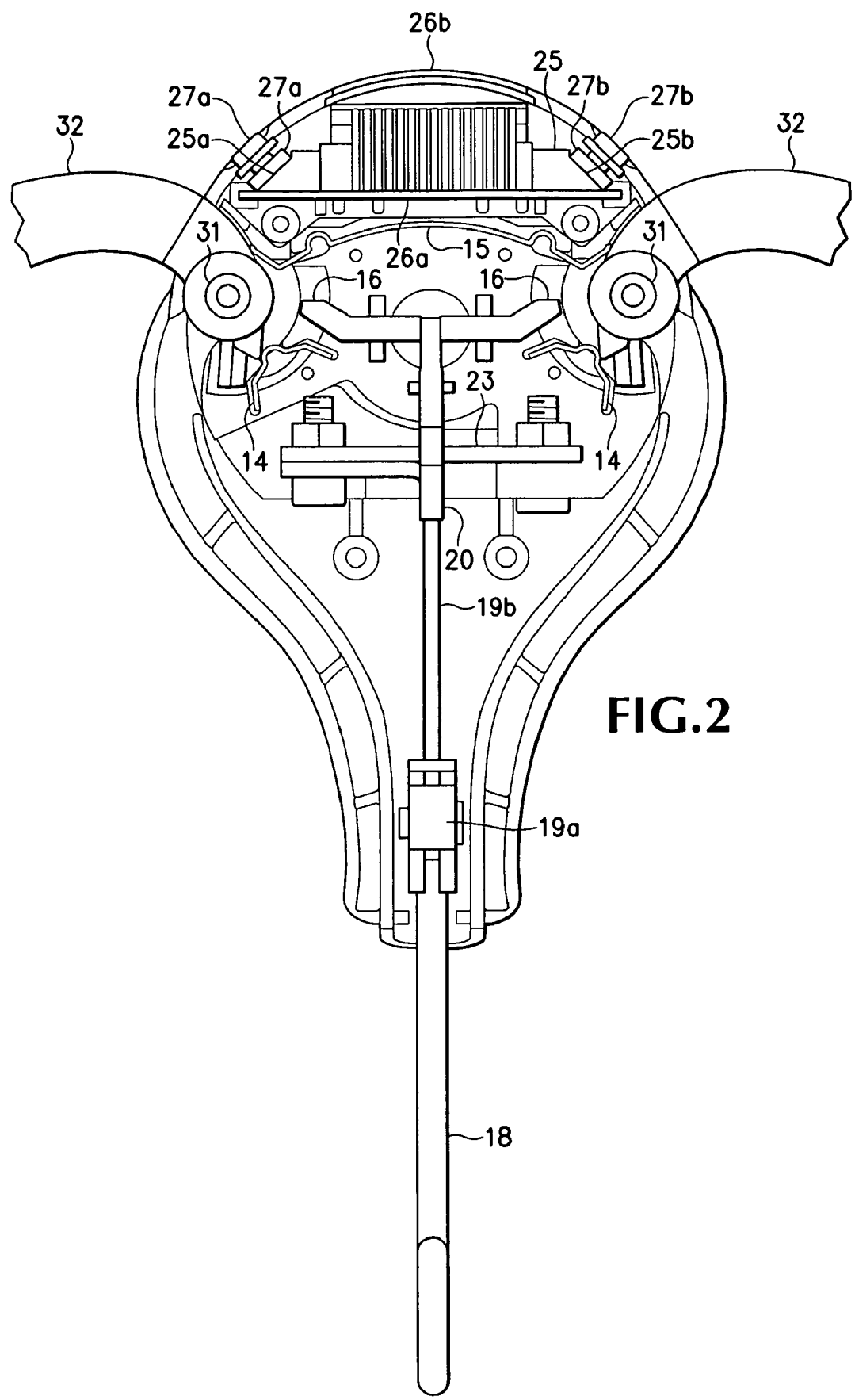
FIG. 2 is a front elevational view of the scale of FIG. 1 with the face plate removed to show its components.

Referring to the drawings, wherein like numbers refer to the same elements, there is shown in FIGS. 1-5 the portable scale 1 of the invention comprising a housing 10 containing the scale's components; a housing cover 11a and housing faceplate 11b; S-shaped spring-loaded handles 12 in cooperative relationship with springs biasing them into an extended position away from the housing; a handle lock/release mechanism comprising in combination handles chassis 13, handle springs 14, stops 15 for handle springs 14, handle stops 16 and handle stops face plate 17; weighing hook 18; captive trolley 19a pivotally connected to hook 18; slotted rail 19b within which captive trolley 19a slides; hook release/catch 20; open/lock switch 21 for unlocking handles from retracted/stowed position to extended locked position and for releasing hook 18; washers 22a and spring 22b to bias open/lock switch 21 outwardly; combination slotted rail bracket and weight sensor platform 23; weight sensor 24; light emitting-diode (LED) and liquid crystal display (LCD) support 25; on/off button support 25a; lb/kg mode button support 25b; LED 26a and LCD display 26b; LED, LCD and weight sensor on/off switch 27a and its associated external button 27b; LCD display and weight mode (lbs./kg.) switch 28a together with its associated external button 28b; battery compartment 29; battery springs 30a and 30b and battery cover 30c; housing fastener bolt guides 31; and optional elastomeric handle sleeves 32.

Figure 5:
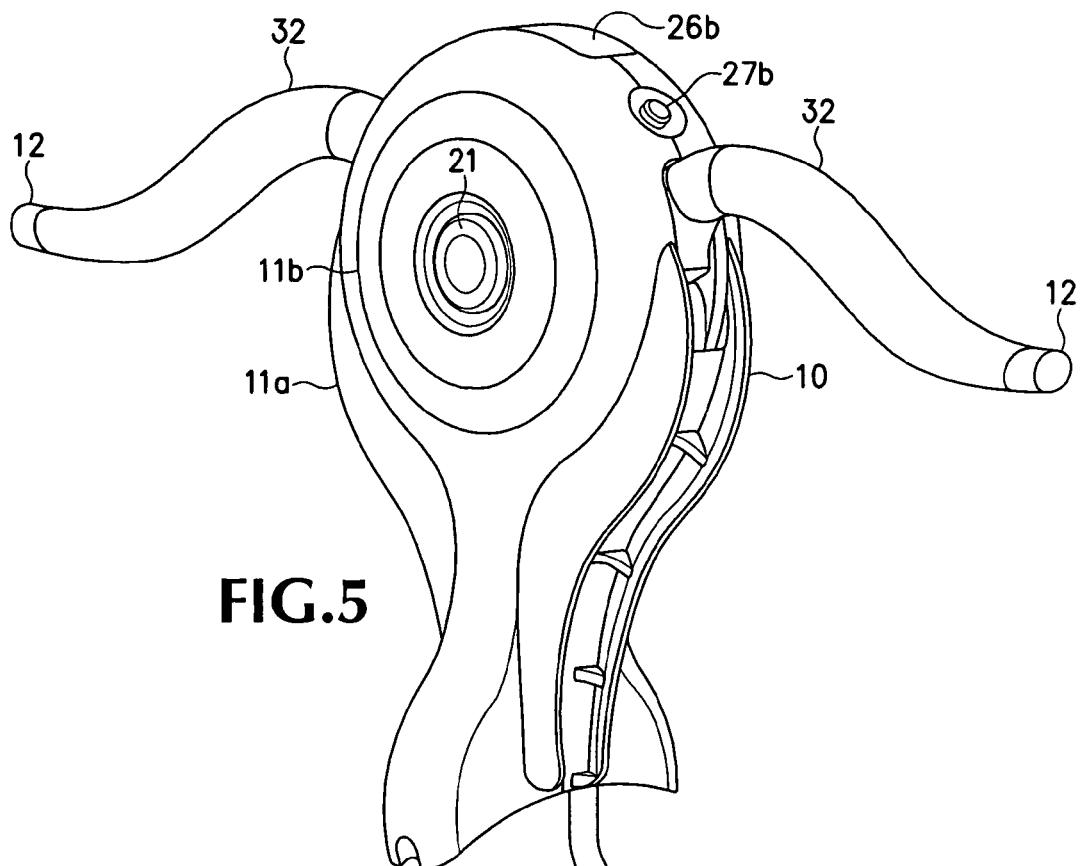
FIG. 5 is a front perspective view of the scale of FIG. 1 with its handles and weighing hook in an open position ready for use.
Figure 6:
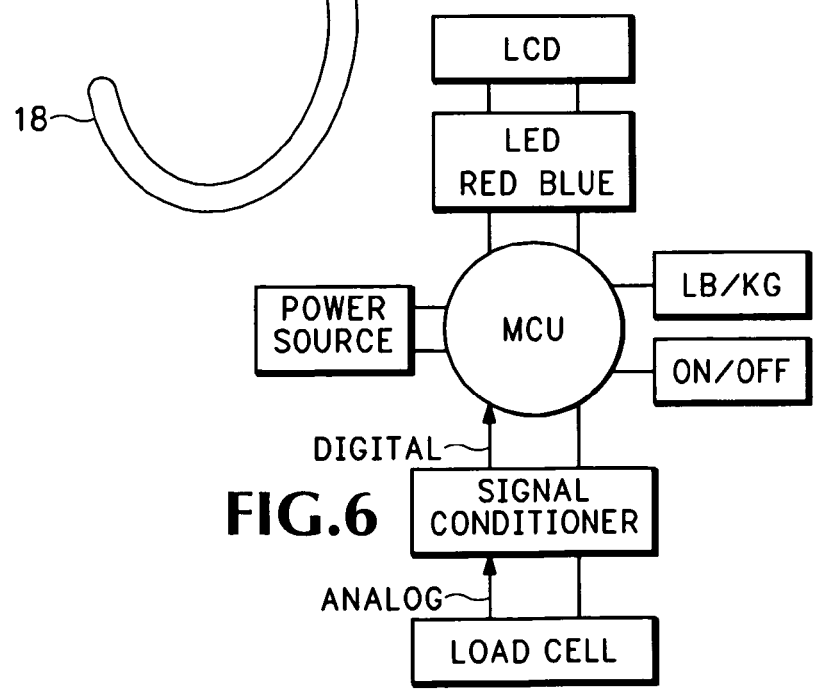
FIG. 6 is a block diagram of exemplary electrical circuitry for the portable scale of the invention.

There is shown in FIG. 5 a diagram of the electrical circuitry of the portable luggage scale of the invention, all of which is conventional. In particular, a power source such as a 6-volt DC battery is connected to a microprocessor control unit (MCU), which receives a digital signal from a load cell via a signal conditioner that converts an analog signal from a strain gauge-type load cell that changes its electrical resistance when it is stressed by the downward pull of the item on the weighing hook. The MCU sends the digital signal to the LED which in turn sends a signal to an LCD to display the weight in either pounds or kilograms, which is controlled by the pound/kilogram mode button. The circuit is activated by the on/off button, which simultaneously activates the MCU, the load cell, the signal conditioner, the LED and the LCD. The MCU is also preferably programmed to take into account the tare weight of a container by first weighing the container, then effectively subtracting the weight of the container by zeroing out the digital display by pressing and holding down the on/off button continuously for, say 10 seconds.

In operation, spring-loaded handles 12 and weighing hook 18 are released from their stowed and locked position within housing 10 by depressing open/lock switch 21 and raising handles 12 up to their locked position, whereupon they are engaged by handle stops 16; when open/lock switch 21 is depressed, it also releases hook release/catch 20 so as to allow captive trolley 19a to drop down slotted rail 19b, thereby clearing hook 18 from the housing. Button 27b associated with on/off switch 27a for the LED/LCD and weight sensor is depressed, thereby turning on both the LED/LCD and the weight sensor. Then button 28b is depressed if necessary to select the correct weight mode as between pounds and kilograms. Hook 18 is then looped through, for example, the handle of the luggage piece and raised off the ground with the two handles, whereupon its weight is measured and displayed on LCD 26b. S-shaped handles 12 are ergonomically designed to provide good balance of the weighed item and a comfortable fit in the hands of the user during lifting and weighing. Elastomeric sleeves 32 over handles 12 add to such comfort. As long as the item being weighed is lifted in close proximity to the person using the scale, its weight is viewable on the display by the user from directly above the scale.

To take into account the tare weight of, for example, a container, the container is first weighed empty and, while the container is still on the hook, the on/off button is again depressed and held down until the display reads zero. The container is then disengaged from the hook, filled with item (s) to be weighed, then reattached to the hook to be weighed as described above. In this manner, the actual weight of the contents of the luggage may be determined. This feature is useful, for example, when buying produce by the pound or when net weight of an item to be shipped is needed for a shipping document.

For those finding it difficult to read small numbers at a distance of two to three feet, the display may be programmed to change the background color when a predetermined maximum weight is met or exceeded. Thus, for example, if the display usually has a blue background while displaying weight, when a predetermined maximum weight is met or exceeded, the background color would switch to red, thereby signaling the user that the item is overweight. The MCU may be programmed to set the maximum weight at, for example 50 lbs. (23 kg.) and to reset that maximum weight to, for example 40 lbs. (15 kg.) by simply turning the device on with the on/off button and holding the weight mode button down for five seconds; when the 40 lbs./15 kg. appears on the display, the mode button is released and the device is turned off by again pressing the on/off button. The MCU may be similarly programmed to reset the overweight number at 30 lbs. (13.5 kg.) and 20 lbs. (9 kg.).

To return the handles to their retracted and stowed positions, they are simply folded down into the sides of the housing until they again reengage handle stops 16. Hook 18 is then simply pushed back into the housing via captive trolley 19a and slotted rail 19b, whereupon the captive trolley is reengaged by hook release/catch 20, thereby stowing the end of the hook within the housing so that it will not accidentally catch on anything.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A portable scale comprising:
   (a) a housing having a top end and a bottom end;
   (b) two spring-loaded handles retractable into and extendable from said housing;
   (c) a weighing hook retractable into and extendable from the bottom end of said housing;
   (d) a guide mechanism comprising a slotted rail and a captive trolley connected to said weighing hook for dropping said weighing hook into an extended position away from the bottom end of said housing;
   (e) a lock/release mechanism for
      (i) locking said handles into extended positions away from said housing;
      (ii) locking said handles and said weighing hook into retracted positions within said housing; and
      (iii) releasing said handles and said weighing hook from retracted positions within said housing;
   (f) a switch in said housing for operating said lock/release mechanism;
   (g) a weight sensor in said housing operatively connected to said weighing hook;
   (h) an LED display in the top end of said housing and in electronic communication with said weight sensor; and
   (i) an on/off switch in electronic communication with said weight sensor and said LED display.

2. The scale of claim 1 wherein each of said handles being S-shaped.

3. The scale of claim 1 wherein said scale partially made in one color.

4. The scale of claim 1 wherein said scale entirely made in one color.

5. The scale of claim 1 further comprising electrical circuitry permitting said LED display to display weight in pounds or kilograms.

6. The scale of claim 5 further comprising electrical circuitry permitting said LED display to display weight in a first background color and to display a predetermined maximum weight in a second background color when said predetermined maximum weight is met or exceeded.

7. The scale of claim 6 further comprising electrical circuitry permitting said predetermined maximum weight to be adjusted.

8. The scale of claim 6 further comprising electrical circuitry permitting said scale to calculate and subtract the tare weight of a container.

9. The scale of claim 1 including an on/off switch in electronic communication with said weight sensor and said LED display.

10. The scale of claim 9 further comprising at least one battery for an electrical power source for providing power to the circuitry in said scale.

11. The scale of claim 2 further comprising elastomeric sleeves on said handles.

12. The scale of claim 11 wherein said housing partially made in one color.

13. The scale of claim 9 wherein said housing entirely made in one color.

14. The scale of claim 6 wherein said handles partially made in one color.

15. The scale of claim 8 wherein said handles entirely made in one color.

16. The scale of claim 5 wherein said weighing hook partially made in one color.

17. The scale of claim 10 wherein said weighing hook entirely made in one color.

18. The scale of claim 9 wherein said on/off switch partially made in one color.

19. The scale of claim 9 wherein said on/off switch entirely made in one color.

20. The scale of claim 1 wherein said scale made in at least one color.

* * * * *